3,463,776
STEROIDAL 6-CYCLOPROPYL-4-EN-3-ONES AND PROCESS FOR PREPARING SAME
Michael George Lester, Oliver Stephenson, and Vladimir Petrow, London, England, assignors to The British Drug Houses Limited
No Drawing. Filed Sept. 9, 1966, Ser. No. 578,154
Claims priority, application Great Britain, Sept. 23, 1965, 40,556/65
Int. Cl. C07c 173/00, 169/36; A61k 17/00
U.S. Cl. 260—239.57  3 Claims

ABSTRACT OF THE DISCLOSURE

Steroidal 6-cyclopropyl-4-en-3-ones having useful biological properties are prepared by reacting steroidal 6-methylene-4-en-3-ones with a dialykyl or diarylsulphoxonium methylide in an anhydrous unreactive solvent medium.

This invention is for improvements in or relating to organic compounds, and has particular reference to a class of steroidal materials, namely 6-cyclopropyl-4-en-3-ones.

It is an object of the present invention to provide certain steroidal 6-cyclopropyl-4-en-3-ones, which compounds are of value on account of their biological properties. Thus, the compounds of the present invention may possess anabolic, androgenic, claudogenic, progestational, anti-endotoxic or anti-inflammatory properties, which render them of value for therapeutic or veterinary use. In addition, the compounds of the present invention have great utility as intermediates for the preparation of compounds with valuable biological properties.

The invention provides the following new compounds:
17β-acetoxy-6-cyclopropyl-19-morandrost - 4 - en-3-one, which has anabolic and claudogenic properties.

6-cyclopropyl-16α,17α - isopropylidenedioxypregn - 4-en-3-one, which has anti-inflammatory and progestational properties.

17β-acetoxy-6-cyclopropyl - 16 - methylenepregn-4-ene-3,20-dione, which has progestational, anti-endotoxic, anti-inflammatory and anti-ovulatory properties. It is also of interest in experimental tumor chemotherapy.

6-cyclopropyl-17α-acetoxypregn - 4 - ene-3,20-dione, which has progestational, anti-ovulatory and gonadotrophin-inhibiting properties.

17α, 20:20,21-bismethylenedioxy - 6 - cyclopropyl-pregn-4-ene-3,11-dione, which may be converted by methods of prior art into the corresponding corticoid which has biological properties associated with cortisone.

6-cyclopropyl-17α,20α-dihydroxy - 20β - methyl - 3-oxopregn-4-en-21-oic acid γ-lactone.

6-cyclopropyl-17α-hydroxy-20-methyl - 3 - oxypregna-4,20-dien-21-oic acid γ-lactone, which have antibiotic properties.

According to the present invention there is provided a process for the preparation of steroidal 6-cyclopropyl-4-en-3-ones of the D-homoandrostane, 19-norandrostane, pregnane, 19-norpregnane and D-homopregnane series of partial formula (I):

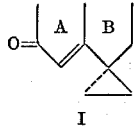 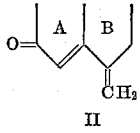

I  II which process comprises reacting a corresponding steroidal 6-methylene-4-en-3-one of partial Formula II with carbene.

The carbene is preferably generated in situ from a dialkyl- or diarylsulphoxonium methylide.

In carrying the process of the invention into effect the 6-methylene-4-en-3-one (II) either in the solid state or in a suitable solvent, such for example as a lower ether, tetrahydrofuran, dioxan, dimethyl sulphoxide, dimethylformamide or a halogenated hydrocarbon, may be reacted preferably in an inert atmosphere with a solution containing 1 or more equivalents of a dialkyl- or diarylsulphoxonium methylide, preferably dimethylsulphoxonium methylide. The dialkyl or diarylsulphoxonium methylide may be prepared by reacting a dialkyl or diarylmethylsulphoxonium halide preferably trimethylsulphoxonium iodide or chloride in a suitable solvent for example dimethyl sulphoxide, tetrahydrofuran or dioxan preferably in the presence of an inert atmosphere with a base such for example as a metal hydride, a metal alkyl or aryl or a metal amide. In a preferred embodiment of the invention, the reaction of the steroid with the methylide reagent is carried out at room temperature. Stirring may be desirable especially where the reaction mixture is not homogeneous. The reaction is normally complete within 4 hours but longer reaction times are not detrimental to the process of the invention. Thereafter the products of the reaction may be isolated, for example by diluting the mixture with water and collecting the separated solids by filtration or if desired, following dilution with water, the mixture may be extracted with a suitable water-immiscible solvent. The products may then be purified by standard techniques.

The process of the invention may be applied to 6-methylene-3-oxo-$\Delta^4$-steroids derived from D-homoandrostane, 19-normandrostane, pregnane, 19-norpregnane, D-homopregnane, cholestane, spirostane, ergostane and stigmastane.

Methods for the preparation of 6-methylene-3-oxo-$\Delta^4$-steroids used as starting materials for the process of the present invention have been described by Burn, Cooley, Davies, Ducker, Ellis, Feather, Hiscock, Kirk, Leftwick, Petrow and Williamson, Tetrahedron, 1964, 20, 597.

The following additional groups will not, in general, interfere with the process of the invention.

Hydroxy or acyloxy groups in various positions in the steroid molecule. A 17α-acyloxy group, however, when in conjunction with a 20-oxo-function may undergo internal condensation to form a γ-lactone during the process of the invention but, if desired, this condensation may be prevented by prior "protection" of the 20-oxo group by conversion into, for example, a ketal derivative. Alternatively, the required 17α-acyloxy group may be subsequently generated from a 17α-hydroxy group which, when in conjunction with a 20-oxo-function is unaffected by the process of the invention.

Groups formed by condensation of 20-ketopregnane-16α,17α-glycols with carbonylic components such as acetone.

Carbonyl groups at $C_{11}$, $C_{12}$, $C_{15}$, $C_{16}$, $C_{17}$, $C_{18}$ and $C_{20}$. Such groups however may undergo conversion to oxiranes during the process of the invention but may be "protected" by prior conversion into, for example, ketal derivatives, and subsequently regenerated is so desired.

Carbalkoxy groups at $C_{13}$, $C_2$, $C_{17}$, $C_{20}$ or in the side chain.

Alkyl groups and in particular methyl groups at $C_1$, $C_2$, $C_{11}$, $C_{16}$, $C_{17}$, $C_{18}$, $C_{19}$, $C_{21}$ and ethyl at $C_{17}$.

Alkenyl and alkynyl groups, in particular vinyl and allyl, trifluoropropynyl, trifluorovinyl, ethynyl, propynyl, chloro- and bromo-ethynyl at $C_{17}$.

Methylene, halomethylene and ethylidene groups at $C_{11}$, $C_{16}$ and $C_{1117}$, methylene, halo and carboxymethylene bridging $C_{16}$ and $C_{17}$.

Lactone, ether and spiroketal residues. Spirolactone residues such as —O.CO.CH₂.CH₂ attached to C₁₇, etheric groups at C₁₆, and bridging C₁₈ and C₂₀, spiroketal moieties such as are present in diosgenin.

Halogen groups and in particular chlorine and fluorine at $C_9$, $C_{11}$, $C_{16}$ and $C_{21}$, and halomethyl at $C_{16}$.

Isolated unsaturated linkages, in particular at $C_{9(11)}$, $C_{11}$, $C_{14}$, $C_{16}$ and $C_{17(20)}$.

Cortical side-chain converted into such "protected" derivatives as bismethylenedioxy. The free cortical side-chain may be subsequently regenerated if desired by methods well known to those skilled in the art.

Epoxides, particularly at $C_{16-17}$.

Additional cyclic structures on ring D and in particular the cyclic structure

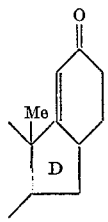

as described in United States Patent No. 3,265,717.

The process of the invention may be applied to the 6-methylene derivatives of the following steroidal 3-oxo-4-enes:

19-nortestosterone
2-methyl-19-nortestosterone
17α-methyl-19-nortestosterone
9(11)-dehydro-17α-methyl-19-nortestosterone
17α-propynyl-, 17α-chlorethynyl-, 17α-trifluoropropynyl, 17α-trifluorovinyl-19-nortesterone
17α-acyloxyprogesterones and 19-nor derivatives thereof
9(11)-dehydro-17α-acyloxyprogesterones
16-methyl-17α-acyloxyprogesterones, 16-halomethyl-17α-acyloxyprogesterones
9(11)-dehydro-16-methyl-17α-acyloxyprogesterones
16-methylene-17α-acyloxyprogesterones, 16-halomethylene-17α-acyloxyprogesterones
9(11)-dehydro-16-methylene-17α-acyloxyprogesterones
17α-acyloxy-16-ethylideneprogesterones
16α,17α-dimethylmethylenedioxyprogesterone
9(11)-dehydro-16α,17α-dimethylmethylenedioxyprogesterone cortisone
16-methylcortisone, 16-halomethylcortisone and the 21-fluoro derivatives thereof
21-methylcortisone and the 21-fluoro derivatives thereof
16-methylenecortisone, 16-halomethylenecortisone and the 21-fluoro derivatives thereof
16α-hydroxy cortisone and the (16α,17α)-acetonide thereof hydrocortisone
16-methylhydrocortisone, 16-halomethylhydrocortisone and the 21-fluoro derivatives thereof
21-methylhydrocortisone and the 21-fluoro derivatives thereof
16-methylenehydrocortisone, 16-halomethylenehydrocortisone and the 21-fluoro derivatives thereof
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α,21-dihydroxypregna-4,9(11)-diene-3,20-dione and the (16,17)-acetonide thereof
21-fluoro-16α,17α-dihydroxypregna-4,9(11)-diene-3,20-dione and the (16,17)-acetonide thereof
21-fluoro-16α,17α-dihydroxypregna-4-ene-3,11,20-trione and the (16,17)-acetonide thereof
21-fluoro-11,16α,17α-trihydroxypregn-4-ene-3,20-dione and the (16,17)-acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4-17-dien-21-oic acid (esters)
3,11-dioxopregna-4,17-dien-21-oic acid (esters)
11-hydroxy-3-oxopregna-4,17-dien-21-oic acid (esters)
9(11)-dehydro-3-oxopregna-4,17-dien-21-oic acid (esters)
21-fluoro-17α-acyloxyprogesterones
progesterone
16-methylprogesterone
11-oxoprogesterone
9(11)-dehydroprogesterone
21-methylprogesterone
diosgenone
16(α and β)-hydroxy-19-nortestosterone
16-methyl-16,17-dehydroprogesterone
16-cyano-progesterone
16-carbalkoxyprogesterones
16-hydroxymethylprogesterone
3-(3-oxo-17β-hydroxyandrost-4-en-17α-yl)propionic acid
21-fluoroprogesterone
testololactone
16-fluoro-corticoids
17α-ethylprogesterone
11β-hydroxypentara-4,17(20)-diene-3,21-dione
The 9α-fluoro derivatives of the above 11β-hydroxy and 11-oxo-steroids Following is a description by way of example of methods of carrying the invention into effect.

EXAMPLE 1

17β-acetoxy-6-cyclopropyl-19-norandrost-4-ene-3-one

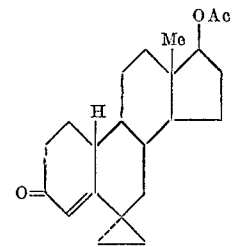

17β-acetoxy-6-methylene-19-norandrost-4-en-3-one (0.75 g.) was added to a solution of dimethylsulphoxonium methylide, prepared under nitrogen at room temperature by stirring trimethylsulphoxonium iodide (0.6 g.) in dimethyl sulphoxide (8 ml.) with a 50% dispersion in oil of sodium hydride (0.12 g.) until evolution of hydrogen had ceased. The mixture was allowed to stand at room temperature under nitrogen for 3½ hours and was then poured with stirring into 200 ml. of water. The precipitated solid was collected by filtration under suction, washed with water and dried in the air. The crude solid was then dissolved in an ethyl acetate/ether/petroleum ether (B.P. 60–80°) mixture (5:5:2 by vol.) and chromatographed on alumina. Elution with this solvent mixture gave a colourless gum which was crystallised by dissolution in 3 ml. of cyclohexane and allowing the mixture to stand at 0° C. overnight. Recrystallisation from petroleum ether (B.P. 60–80°) afforded 17β-acetoxy-6-cyclopropyl-19-norandrost-4-en-3-one, M.P. 107.5° C., $\lambda_{max}$ 248 m$\mu$ ($\epsilon$, 14,700), [α]$_D$+153° (in CHCl₃).

EXAMPLE 2

6-cyclopropyl-16α,17α-isopropylidenedioxypregn-4-ene-3,20-dione

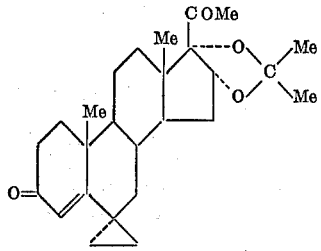

16α,17α-isopropylidenedioxy-6-methylenepregn-4-ene-3,20-dione (1.5 g.) in dry dioxan (15 ml.) was added to a solution of dimethylsulphoxonium methylide, prepared under nitrogen at room temperature by stirring trimethylsulphoxonium iodide (1.0 g.) in dimethyl sulphoxide (15 ml.) with a 50% dispersion in oil of sodium hydride (0.2 g.) until evolution of hydrogen had ceased (10–20 minutes). The mixture was allowed to stand at room temperature under nitrogen for 4 hours and was then poured with stirring into 250 ml. of water. The precipitated solid was collected by suction filtration, washed with water and dried on the steam bath. Crystallisation from ethanol gave 6-cyclopropyl-16α,17α-isopropylidenedioxypregn-4-ene-3,20-dione, M.P. 181° C., $\lambda_{max}$ 248 m$\mu$ ($\epsilon$ 14,400), $[\alpha]_D^+$ 231° (in CHCl$_3$).

EXAMPLE 3

17α-acetoxy-6-cyclopropyl-16-methylenepregn-4-en-3,20-dione

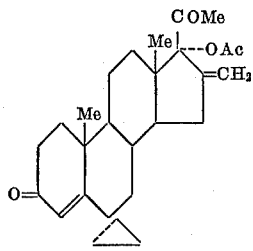

17α-acetoxy-6,16-dimethylenepregn-4-en-3,20-dione (1.0 g.) in 10 ml. dry tetrahydrofuran was added at room temperature to a solution of dimethylsulphoxonium methylide, prepared under nitrogen by heating for 4 hours under reflux with stirring a mixture of trimethylsulphoxonium chloride (0.77 g.) and a 50% dispersion in oil of sodium hydride (0.15 g.) in dry tetrahydrofuran (10 ml.). The mixture was allowed to stand at room temperature under nitrogen for 8 hours. It was then poured into 200 ml. of water with stirring, and the crude product was extracted with ethyl acetate (2×50 ml.). The combined extracts were washed with water, dried and evaporated to give a residue which was crystallised from aqueous ethanol to give 17α-acetoxy-6-cyclopropyl-16-methylenepregn-4-en-3,20-dione, M.P. 187.5° C., $\lambda_{max}$ 248 m$\mu$ ($\epsilon$, 14,700), $[\alpha]_D$+67° (in CHCl$_3$).

EXAMPLE 4

6-cyclopropyl-17α-acetoxypregn-4-en-3,20-dione

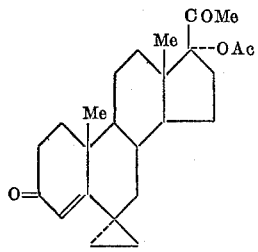

17α-hydroxy-6-methylenepregn-4-en-3,20-dione (1 g.) was added to a solution of dimethylsulphoxonium methylide, prepared under nitrogen at room temperature by stirring trimethylsulphoxonium iodide (0.7 g.) in dimethyl sulphoxide (10 ml.) with a 50% dispersion in oil of sodium hydride (0.14 g.) until evolution of hydrogen had ceased. The mixture was allowed to stand at room temperature under nitrogen for 3 hours and was then poured with stirring into 200 ml. of water. The precipitated solid was collected by suction filtration, washed with water and dried on the steambath. Crystallisation from acetone/petroleum ether (B.P. 60–80°) afforded 6-cyclopropyl-17α-hydroxypregn-4-en-3,20-dione, M.P. 228° C., $[\alpha]_D$ 203° (in CHCl$_3$) $\lambda_{max}$ 248.5 m$\mu$ ($\epsilon$ 14,400).

On refluxing 8 hours in acetic anhydride was obtained 17α-acetoxy-6-cyclopropylpregn-4-en-3,20-dione, M.P. 223° C., $\lambda_{max}$ 249 m$\mu$ ($\epsilon$, 13,300) $[\alpha]_D$+188° (in CHCl$_3$).

EXAMPLE 5

17α,20:20,21-bismethylenedioxy-6-cyclopropylpregn-4-ene-3,11-dione

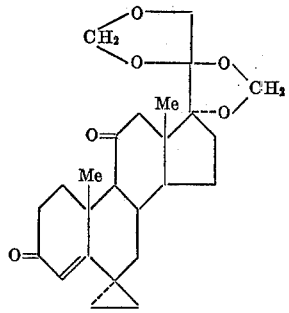

17α,20:20,21-bismethylenedioxy-6-methylenepregn-4-ene-3,11-dione (0.9 g.) was added to a solution of dimethylsulphoxonium methylide, prepared under nitrogen at room temperature by stirring trimethylsulphoxonium iodide (0.6 g.) in dimethyl sulphoxide (10 ml.) with a 50% dispersion in oil of sodium hydride (0.12 g.) until evolution of hydrogen had ceased. The mixture was allowed to stand at room temperature under nitrogen for 3 hours and was then poured into 200 ml. of water. The solid which separated was collected by suction filtration, washed with water and dried on the steambath. Crystallisation from ethyl acetate gave 17α,20:20,21-bismethylenedioxy-6-cyclopropylpregn-4-ene-3,11-dione, M.P. 235° C., $\lambda_{max}$ 247 m$\mu$ ($\epsilon$ 13,500), $[\alpha]_D$+ 152 (in CHCl$_3$).

EXAMPLE 6

6-cyclopropyl-17α,20α-dihydroxy-20β-methyl-3-oxopregn-4-en-21-oic acid γ-lactone

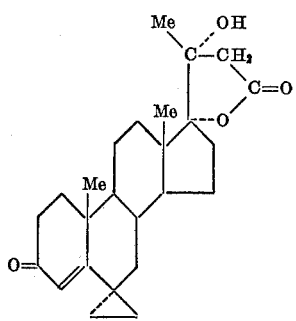

17α-acetoxy-6-methylenepregn-4-ene-3,20-dione (2 g.) was added to a solution of dimethylsulphoxonium methylide, prepared under nitrogen at room temperature by stirring trimethylsulphoxonium iodide (1.5 g.) in dimethyl sulphoxide (25 ml.) with a 50% dispersion in oil of sodium hydride (0.28 g.) until evolution of hydrogen had ceased (10–20 minutes). The mixture was allowed to stand at room temperature under nitrogen for 4 hours and was then poured with stirring into 400 ml. of water. The precipitated solid was collected by suction filtration, washed with water and dried. The product was then isolated from the crude solid by chromatography on alumina. Crystallisation from acetone gave 6-cyclopropyl-17α,20α - dihydroxy - 20β - methyl - 3 - oxopregn - 4 - en-21 - oic acid γ - lactone, m.p. 241° C., $\lambda_{max.}$ 24mμ (ε 13,500), $[\alpha]_D^+$ 173 (in dioxan).

EXAMPLE 7

6-cyclopropyl-17α-hydroxy-20-methyl-3-oxopregna-4,20-dien-21-oic acid γ-lactone

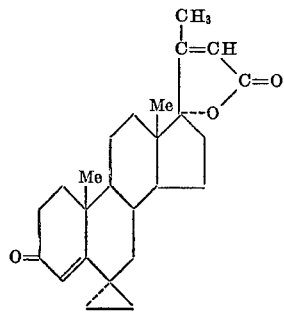

From another fraction from the chromatographic procedure described in Example 6 was obtained after crystallisation from acetone 6 - cyclopropyl - 17α - hydroxy 20-methyl - 3 - oxopregna - 4,20 - dien - 21 - oic acid γ-lactone, m.p. 260° C., $\lambda_{max.}$ 224 mμ (ε 17,200) and 242 mμ (ε 14,600).

We claim:

1. 17α - acetoxy - 6 - cyclopropyl - 16 - methylene-pregn-4-ene-3,20-dione.

2. 6 - cyclopropyl - 17α,20α - dihydroxy - 20β - methyl-3-oxopregn-4-en-21-oic acid γ-lactone.

3. 6 - cyclopropyl - 17α - hydroxy - 20 - methyl - 3-oxopregna-4,20-dien-21-oic acid γ-lactone.

References Cited

UNITED STATES PATENTS

| | | | |
|---|---|---|---|
| 3,261,829 | 7/1966 | Colton et al. | 260—239.5 |
| 3,373,157 | 3/1968 | Georgian et al. | 260—239.55 |

OTHER REFERENCES

Hackh's Chemical Dictionary 3rd Ed., p. 241, 1944.

HENRY A. FRENCH, Primary Examiner

U.S. Cl. X.R.
260—239.55, 397.4, 999